United States Patent
Hochscherff et al.

(10) Patent No.: US 7,379,736 B2
(45) Date of Patent: May 27, 2008

(54) METHOD AND DEVICE FOR SELECTIVELY CONTROLLING NETWORK SELECTION IN AN AREA COVERED BY AT LEAST TWO MOBILE COMMUNICATION NETWORKS

(75) Inventors: Andreas Hochscherff, Bonn (DE); Patrik Ljungström, Königswinter (DE); Walter Mohrs, Bonn (DE); Georg Sänger, Linz (DE)

(73) Assignee: T-Mobile Deutschland GmbH, Bonn (DE)

( * ) Notice: Subject to any disclaimer, the term of this patent is extended or adjusted under 35 U.S.C. 154(b) by 124 days.

(21) Appl. No.: 10/240,143

(22) PCT Filed: Mar. 29, 2001

(86) PCT No.: PCT/DE01/01195

§ 371 (c)(1),
(2), (4) Date: Mar. 31, 2003

(87) PCT Pub. No.: WO01/76272

PCT Pub. Date: Oct. 11, 2001

(65) Prior Publication Data

US 2004/0038676 A1    Feb. 26, 2004

(30) Foreign Application Priority Data

Mar. 31, 2000  (DE) .............................. 100 16 034
Jan. 12, 2001  (DE) .............................. 101 01 509

(51) Int. Cl.
*H04Q 7/20* (2006.01)

(52) U.S. Cl. ............... 455/432.1; 455/435.1; 455/435.2; 455/426.1; 455/436; 455/442; 455/450; 455/558; 370/331; 370/329

(58) Field of Classification Search ............. 455/435.2, 455/558, 432.1, 434, 435.1, 436, 450, 418, 455/422.1, 424, 425, 426.1, 442; 370/331, 370/329

See application file for complete search history.

(56) References Cited

U.S. PATENT DOCUMENTS 5,761,618 A    6/1998   Lynch et al. ................ 455/419
5,881,235 A *  3/1999   Mills .......................... 455/419

(Continued)

FOREIGN PATENT DOCUMENTS

EP        0 888 025      12/1998

(Continued)

OTHER PUBLICATIONS

WO 98/31169 Einola, Method and arrangement for handling subscriber data, Jul. 16, 1998.*

*Primary Examiner*—Nghi H. Ly
(74) *Attorney, Agent, or Firm*—Baker & Daniels LLP

(57) ABSTRACT

The invention relates to methods and systems for selectively controlling network selection in an area covered by at least two mobile communication networks. According to the first method, the area which is to be covered is divided up into zones and a specific code is allocated to each individual zone. Said codes are stored in a storage system and the network is selected on the basis thereof. Alternately, a correlation is made between information on a subscriber identification module (SIM) and signals from a cell broadcast channel which is used to select the network.

9 Claims, 4 Drawing Sheets

U.S. PATENT DOCUMENTS

| | | | |
|---|---|---|---|
| 5,915,225 A * | 6/1999 | Mills | 455/558 |
| 5,920,815 A | 7/1999 | Akhavan | 455/426 |
| 5,999,811 A | 12/1999 | Molne | 455/432 |
| 6,044,261 A | 3/2000 | Kazmi | 455/408 |
| 6,148,192 A * | 11/2000 | Ahvenainen | 455/410 |
| 6,185,421 B1 * | 2/2001 | Alperovich et al. | 455/433 |
| 6,556,842 B1 * | 4/2003 | Ericsson | 455/558 |
| 6,745,029 B2 * | 6/2004 | Lahtinen et al. | 455/432.1 |

FOREIGN PATENT DOCUMENTS

| | | |
|---|---|---|
| GB | 2 315 193 | 7/1996 |
| WO | WO 97/30561 | 2/1997 |
| WO | WO 98/02008 | 1/1998 |
| WO | WO 98/42151 | 3/1998 |
| WO | WO 98/39940 | 9/1998 |
| WO | WO 99/49690 | 9/1999 |

* cited by examiner

METHOD AND DEVICE FOR SELECTIVELY CONTROLLING NETWORK SELECTION IN AN AREA COVERED BY AT LEAST TWO MOBILE COMMUNICATION NETWORKS

Figure 1:
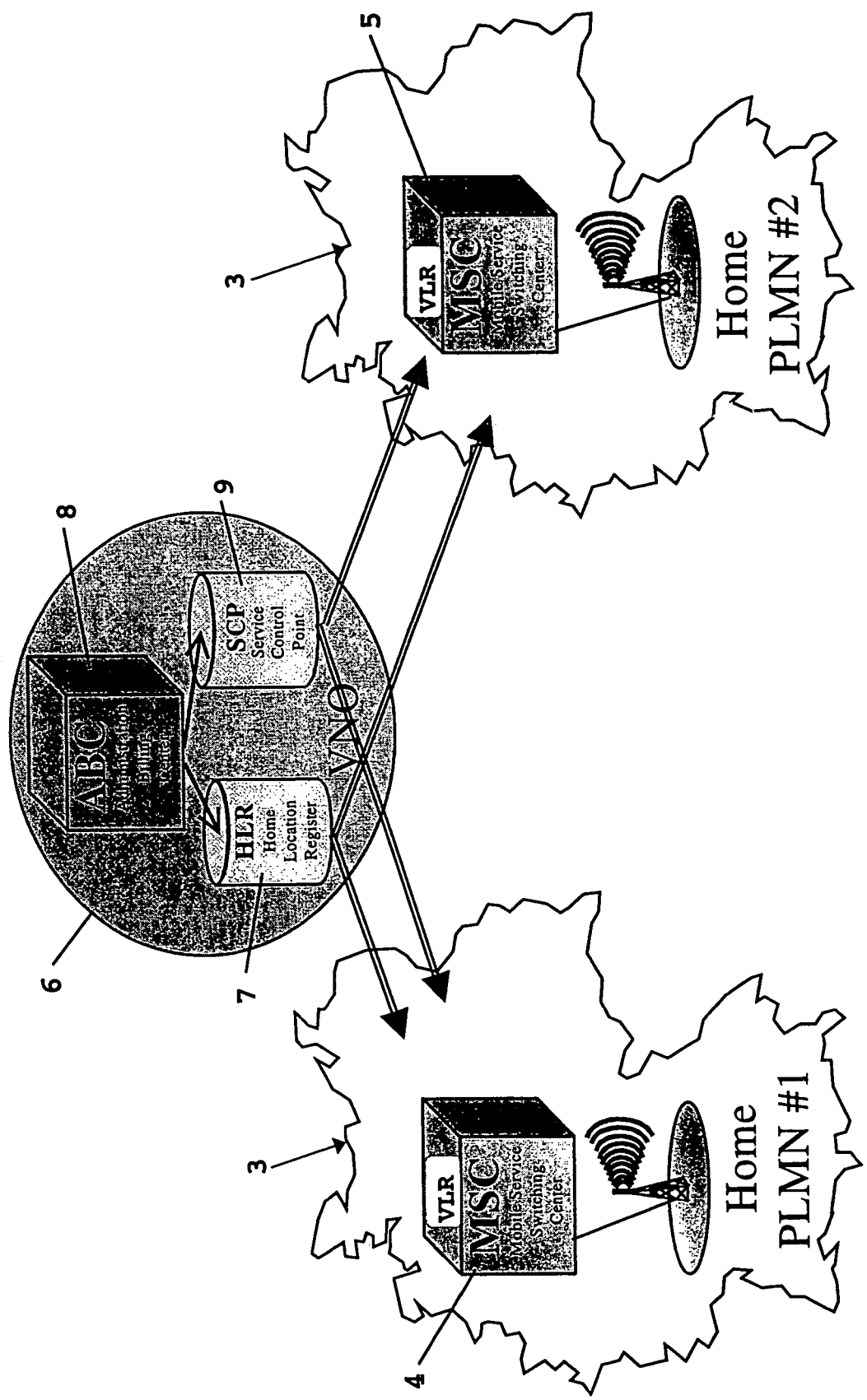

The invention concerns method and a system for selectively controlling network selection in an area covered by at least two mobile communication networks At the present time an intensified discussion about the topic virtual network operator (VNO) takes place in Europe. Among other things a model is discussed, in which a VNO with its own home location register (HLR) (and thus with its own IMSI- and MSISDN area) relies on the network access lines of at least two mobile communication networks (Public Land Mobile Network, PLMN). Other GSM infrastructure such as base stations (BTSs), base station controls (BSCs) and mobile switching centers I visitor log registers (MSC/VLR) are supplied by the mobile communication network carriers. The connection is shown in FIG. 1.

Two mobile communication networks 1 and 2 are shown schematically. Both cover a coverage area 3, for example the Federal Republic of Germany or at least sections of it. For each of the mobile communication networks 1, 2 a mobile switching center 4 and 5 (MSC) is represented symbolically respectively as part of the mobile communication networks.

The virtual network operator 6 (VNO), which operates as a kind of a mobile communication network carrier, uses the infrastructure of both mobile communication networks 1 and 2, in order to offer its customers mobile communication services. The user data of the customers are administered centrally in a home location register 7 (HLR) of the VNO 6. Accounting and control of the services are likewise executed in appropriate set-ups 8, 9 of the VNO. The user (customer of the VNO) can log into both mobile communication networks, whereby the controlling of the network selection takes place via the VNO 6. The VNO 6 provides the necessary user data for the mobile communication networks 1, 2.

The scenario described above is of special interest from the view of the VNO, if it has a possibility available for the selectively controlling of the network selection for its users. This possibility would be the prerequisite, in order to play the network carriers against each other in regard to the price. This playing against each other however is not in the interest of the concerned network carriers.

U.S. Pat. No. 5,761,618 describes a mobile telephone system, with which the mobile telephones are modified by transfer of data through the mobile communication system in such a manner that place in particular during roaming an automatic selection of the preferred service provider or mobile communication network takes place. The individual mobile communication networks are identified by a system identification SID, which is compared to a data list stored in the mobile telephone. The mobile communication system with highest priority, specified in the data list, is selected. In order to do this the software of the mobile telephone must be modified or a data list of the "permitted" service providers has to be loaded into the memory of the mobile telephone on a regular basis. A similar procedure is described in WO 97 30 561.

WO 98 42151 describes a procedure for the allocation of an individual so-called home location zone to a mobile station. Each mobile station is assigned at least one home location zone or cost-reduced account zone. Within the home location zone the telecommunication services used by the mobile station are billed according to a special tariff The home location zone is stored in the HLR of the mobile communication system. By comparison of the current location of the mobile station with the stored home location zone it is determined whether the mobile station is in the home location zone. This procedure is used only within a mobile communication network.

The document GB 2 315 193 describes a private sub mobile communication network within a public mobile communication network. The private sub mobile communication network covers a partial area of the public mobile communication network. An individual network identity code is assigned both to the private sub mobile communication network and the public mobile communication network. A mobile station can identify the respective mobile communication network based on this network identity code. The mobile station can log into the selected mobile communication network, whereby in the network it is checked whether the mobile station is permitted to do so.

WO 99 49690 deals with the selection of a suitable carrier service, e.g. GPRS, through a mobile station. A list of the available carrier services is transferred through cell broadcast to the mobile station where the appropriate selection is then made. A selection between several mobile communication networks does not take place.

The documents WO 98 39940 and U.S. Pat. No. 5,920,815 are to be mentioned as well, their subjects however are further off from the subject of the present application.

No solutions to simplify a network selection between several independent mobile communication networks, controlled by a VNO, are addressed in the state of the art discussed above.

The task of the invention is to indicate a procedure and a system for selectively controlling network selection in an area covered by at least two mobile communication networks, which is based exclusively on components of the VNO as well as on open interfaces to the mobile communication networks.

Figure 2:
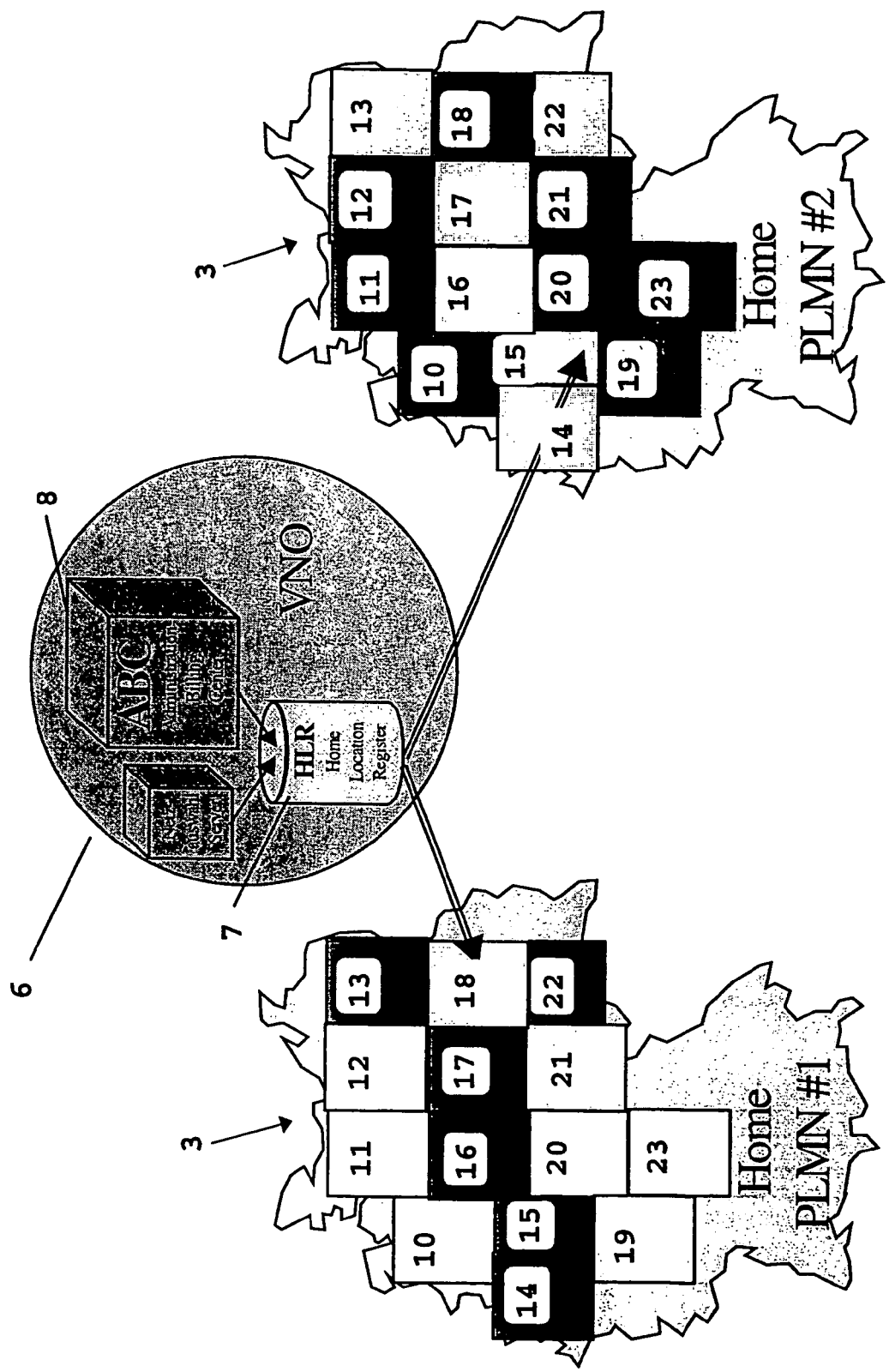
Figure 3:
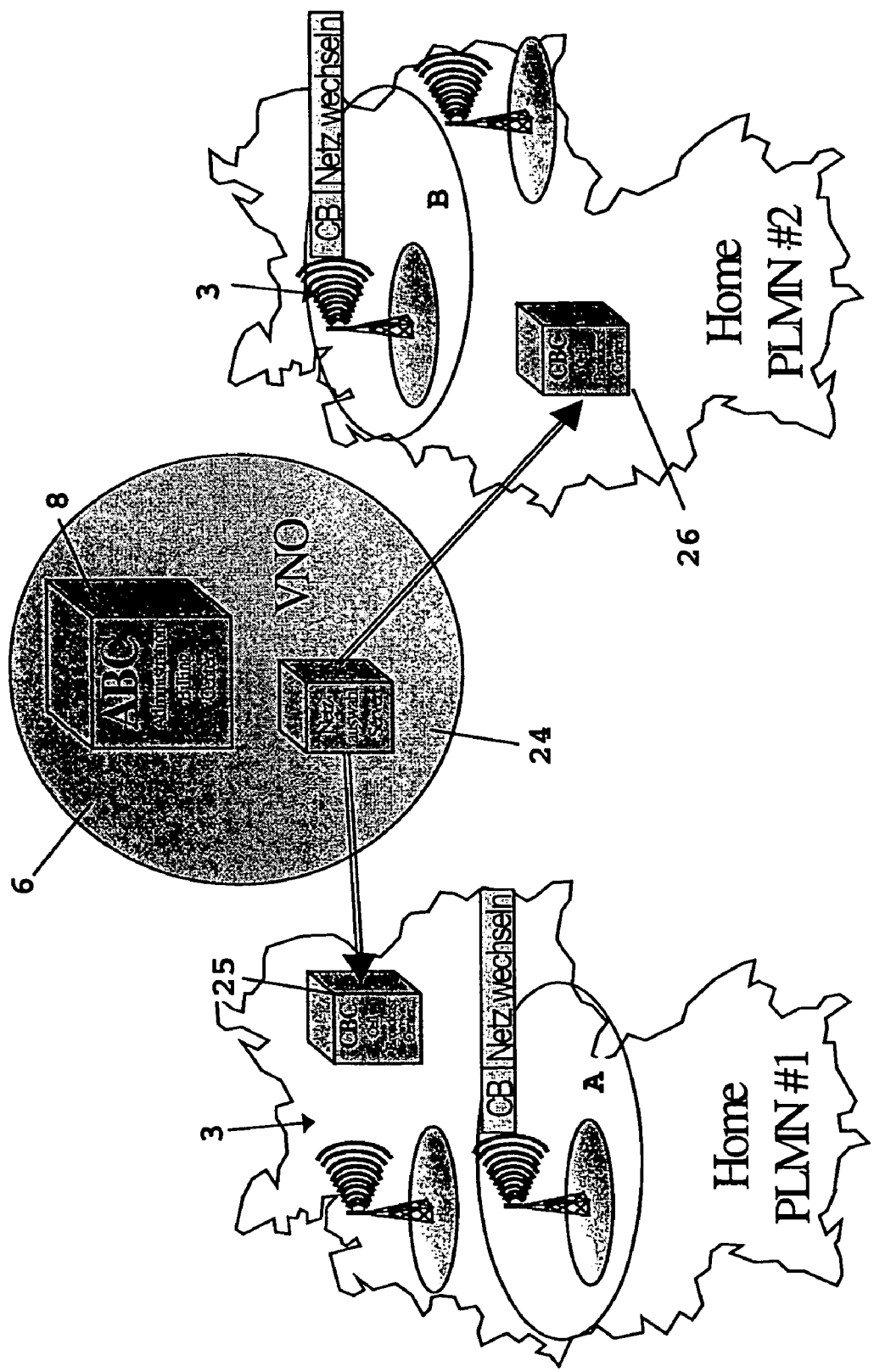
Figure 5:
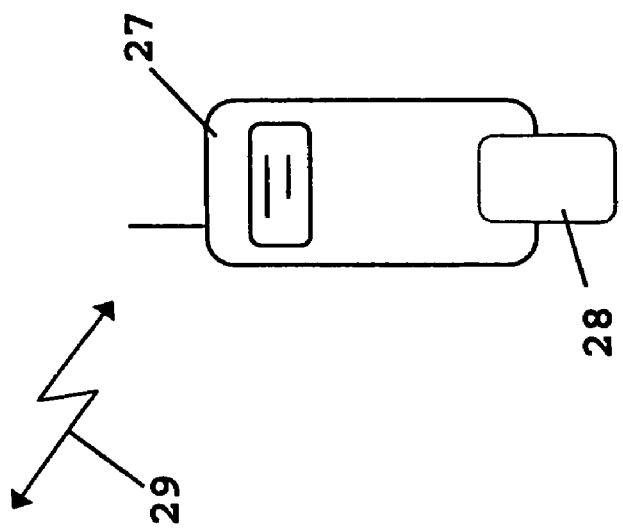
Figure 4:
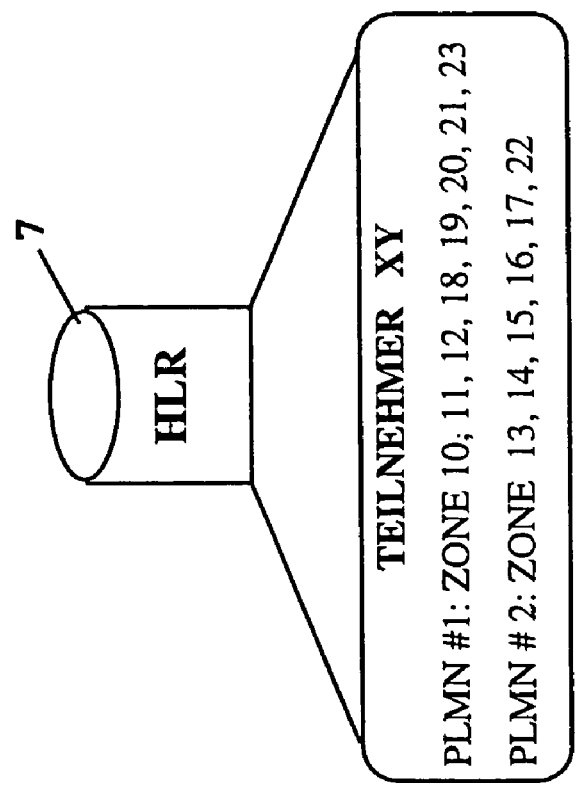

Two design examples of the invention are described in more detail in the following with the help of two drawings. Further features and advantages of the invention result from the drawings and their description. It is shown: FIG. 1: schematic layout of the principle connection between a VNO and two mobile communication networks;

FIG. 2: schematic layout of a first configuration for the completion of the invention;

FIG. 3: schematic layout of a second configuration for the completion of the invention;

FIG. 4: schematic layout of the zone code lists stored in the HLR;

FIG. 5: schematic layout of a cell broadcast message received from a terminal and a SIM.

A possible solution of the invention in accordance with FIG. 2 is based on the GSM capability characteristics regionally subscription:

The coverage area 3 in the affected mobile communication networks 1, 2 is divided in zones 10-23. A network-specific zone code is respectively assigned to the zones 10-23 from the network carrier. In the HLR 7 (of the VNO 6) for each user (or together for all users) a list with zone code per relevant PLMN 1, 2 is managed. This list describes the area of the respective mobile communication network to which the user is permitted to have network access. In the shown example the access is permitted in zones 10, 11, 12, 18, 19, 21 and 23 for the mobile communication network 1, whereas for the mobile communication network 2 the access is permitted in the remaining zones 13, 14, 15, 16, 17 and 22. This is represented schematically in FIG. 4.

Whenever a user logs into a MSC/VLR 4 or 5 a relevant list for the affected PLMN 1 or 2 is loaded respectively into the responsible VLR. In the MSC/VLR the received list is interpreted on the basis of pre-configured data (allocation zone code to cells) and checked with each network access whether this access is permitted.

If a zone code list is modified in the HLR 6, then the new list is immediately transferred applied to the current VLR of the affected user and applied there.

Use of regional subscription for the problem solution: The VNO 6 needs for both "home location networks" 1, 2 the allocation of the zone code to "real" areas. In both networks 1, 2 the relevant coverage area 3 of the two "home location networks" must be covered with the necessary granularity by zones 10-23.

The VNO 6 can determine by configuration of both zone code lists in the HLR 7 (for each users or respectively a general list for all users) in which area the network access performance is to be used by which network carrier. It must only be guaranteed that during the selection of the zones 10-23 the areas exclude themselves respectively. Reconfiguration of the lists can modify the regional allocation, and thus network access performance can be shifted selectively from one network carrier to another.

A possible further solution in accordance with FIG. 3 uses the SIM Application Toolkit (SAT) procedure. In this procedure the SIM is controlled by means of signals of a cell broadcast channel.

State of the art to SAT services and cell broadcast: Basis for the dynamic network carrier selection is a SAT service during which the SIM is controlled via a cell broadcast channel through a download message. The VNO rents respectively an area covering a cell broadcast channel (or a section channel) from the two mobile communication network carriers. In the SIM cards a service is integrated which is controlled via the CB channel.

The cell broadcast service typically offers the possibility to send information (messages) differentiated according to areas (e.g. telecommunications local networks, postal zip code areas, political regions or geographical regions (defined by degrees of longitude and degrees of latitude). This direct sending of the control commands can control the application on the SIM regionally.

The application of SAT services and cell broadcast for the problem solution is described on the basis of FIG. 3 and is explained in the following description. Via the cell broadcast centers 25, 26 of the two "home location networks" 1 and 2 regionally limited network change messages are sent through a network selection server 24 within the area of the VNO 6. The network change message in the region A of the network #1 is sent, if in the future all VNO customers in the region A are to use the network #2. The message is passed on after receipt in the terminal 27 directly to the SIM card 28 by the use of a so-called CB download message, as it is shown in FIG. 5. Accordingly the network change message is sent in the region B of the network #2, if in the future all VNO customers in the region B are to use the network #1.

The application on the SIM card 28 performs after the receipt of the network change messages the following actions:
the network information or the local information of the SIM card 28 is manipulated in such a way that the card "believes" that it is at the present time located in the network #2 (i.e. the new network). E.g. by appropriate setting of the "last registered" field in the location information. Additionally the former network can be also explicitly forbidden. This can take place for example by an appropriate entry in a "Forbidden PLMN" list. A possible entry of the new network in the Forbidden PLMN list must be removed. -a network search is initiated from the terminal 27 by a reset of the SIM card. This leads automatically to a login in network #2 by the manipulated network information or local information on the card 28. Since possibly ongoing conversations are released by the reset, it is to be waited until the end of the conversation before the reset is executed.

Optimization/supplement: For the prevention of abuse of third parties (in particular the two network carriers #1 and #2) the CB channel can be encoded on the application level (between SIM card 28 and network selection server 24). Thereby the authenticity of the change message can be checked in the SIM card.

DRAWING LEGEND

1 Mobile communication network (PLMN)
2 Mobile communication network (PLMN)
3 Coverage area
4 Mobile switching center (MSC)
5 Mobile switching center (MSC)
6 Virtual network operator (VNO)
7 Home location register (HLR)
8 Administrative and account center
9 Service Control Point
10-23 Zones
24 Network selection server
25 Cell Broadcast center
26 Cell Broadcast center
27 Terminal
28 Subscriber Identity Module (SIM)
29 Cell Broadcast channel (message)

The invention claimed is:

1. A method for selectively controlling a network selection change between at least two different mobile communication networks in an area covered by the two mobile communication networks, comprising the steps of:
providing a central mechanism virtual network operator (VNO) that controls the network selection between said at least two different networks within a user subscriber identification module (SIM) operated with a mobile terminal;
while the mobile terminal is logged into a current network in which the terminal is currently registered before logging into another network and without the mobile terminal having to change from one location area to another location area, transmitting a network change message from the VNO to the user identification module (SIM) via a cell broadcast channel, thereby causing a change in configuration of the user identification module (SIM), the change message instructing a change from the current network to another network;
the change in configuration of the user identification module (SIM) then causing the terminal to perform a network selection from the current communication network to the other communication network based on the change message received;
wherein upon the receipt of a change message a reset of the SIM takes place and a network search is initiated from the terminal; and wherein as a consequence of the change message, network information or local information on the SIM is manipulated and as a result logging into the other mobile communication network takes place automatically.

2. A method for selectively controlling a network selection change between at least two different mobile communication networks in an area covered by the two mobile communication networks, comprising the steps of:

providing a central mechanism virtual network operator (VNO) that controls the network selection between said at least two different networks within a user subscriber identification module (SIM) operated with a mobile terminal;

while the mobile terminal is logged into a current network in which the terminal is currently registered before logging into another network and without the mobile terminal having to change from one location area to another location area, transmitting a network change message from the VNO to the user identification module (SIM) via a cell broadcast channel, thereby causing a change in configuration of the user identification module (SIM), the change message instructing a change from the current network to another network; and in response to the change in configuration of the user identification module (SIM) the terminal then initiating a network change selection from the current communication network to the other communication network and logging into the other network based on the change message received.

3. A method according to claim 2 wherein a network selection server within the area of the VNO sends via cell broadcast centers of the mobile communication networks regionally limited change messages, through which the SIM of a user is controlled.

4. A method according to claim 2 wherein upon the receipt of a change message the network information or the local information of the SIM is manipulated in such a way that the SIM assumes that it is at the present time in the other mobile communication network.

5. A method according to claim 2 wherein a cell broadcast channel is encoded on the application level between the SIM and a network selection server.

6. A method for selectively controlling network selection between at least two different mobile communication networks in an area covered by the two mobile communication networks, comprising the steps of:

providing a central mechanism virtual network (VNO) that controls the network selection between said at least two different networks within a user identification module (SIM) operated with a mobile terminal;

while the mobile terminal is logged into a current network in which the terminal is currently registered before logging into another network and without the mobile terminal having to change from one location area to another location area, transmitting a network change message from the VNO to the user subscriber identification module (SIM) via a cell broadcast channel, thereby causing a change in configuration of the user identification module (SIM), the change message instructing a change from current network to another network; and the change in configuration of the user identification module (SIM) then causing the terminal to perform a network selection from the current communication network to the other communication network and logging into the other network based on the change message received, said change message sent in a regionally limited area in which the change of network is to be effected on the SIM.

7. A method according to claim 6 wherein upon the receipt of a change message the network information or the local information of the SIM is manipulated in such a way that the SIM assumes that it is at the present time in the other mobile communication network.

8. A method according to claim 6 wherein a cell broadcast channel is encoded on the application level between the SIM and a network selection server.

9. A method for selectively controlling network selection between at least two different mobile communication networks in an area covered by the two mobile communication networks, comprising the steps of:

providing a central mechanism virtual network (VNO) that controls the network selection between said at least two different networks within a user identification module (SIM) operated with a mobile terminal;

while the mobile terminal is logged into a current network in which the terminal is currently registered before logging into another network and without the mobile terminal having to change from one location area to another location area, transmitting a network change message from the VNO to the user subscriber identification module (SIM) via a cell broadcast channel, thereby causing a change in configuration of the user identification module (SIM), the change message instructing a change from the current network to another network;

the change in configuration of the user identification module (SIM) then causing the terminal to perform a network selection from the current communication network to the other communication network based on the change message received, said change message sent in a regionally limited area in which the change of network is to be effected on the SIM; and wherein upon the receipt of a change message a reset of the SIM takes place and a network search is initiated from the terminal; and wherein as a consequence of the change message, network information or local information on the SIM is manipulated and as a result logging into the other mobile communication network takes place automatically.

* * * * *